May 22, 1951 A. C. GERVAIS 2,553,912
LINE GUIDE STABILIZER
Filed Nov. 12, 1948
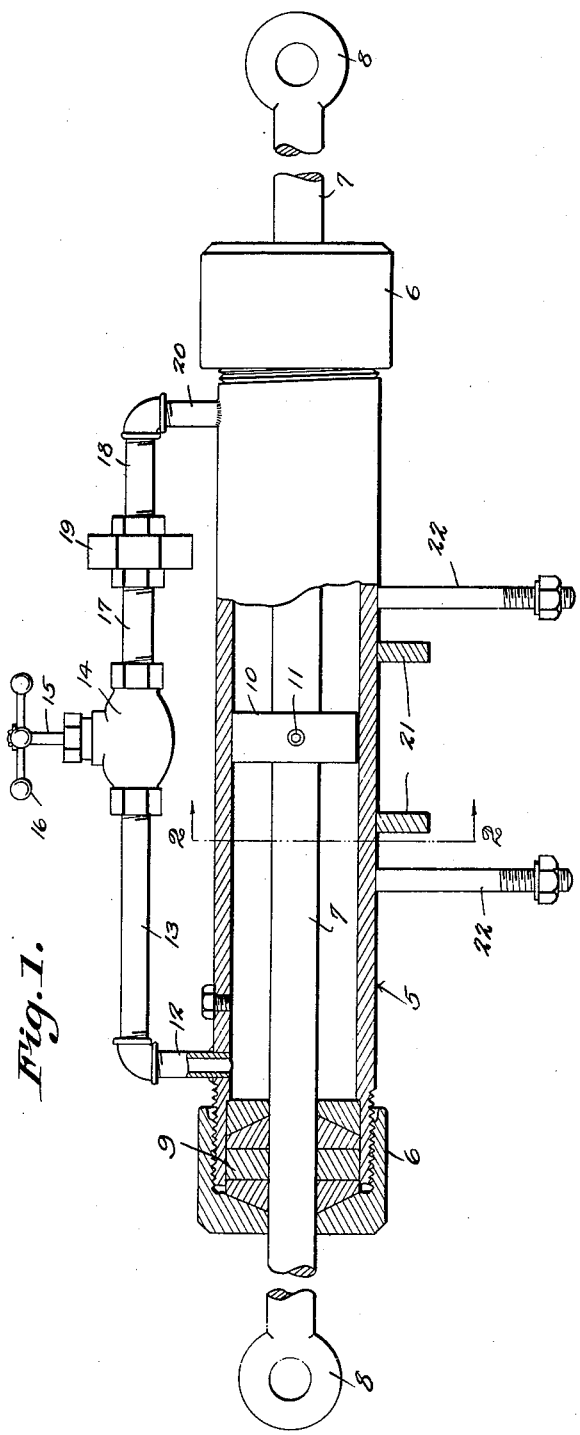
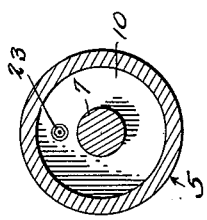
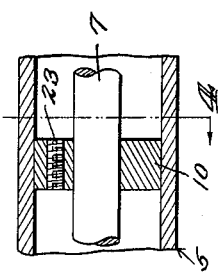
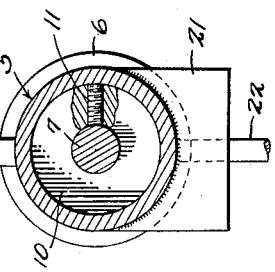
A. C. Gervais
INVENTOR
BY
ATTORNEYS.

Patented May 22, 1951

2,553,912

UNITED STATES PATENT OFFICE 2,553,912

LINE GUIDE STABILIZER

Armand C. Gervais, Jennings, La.

Application November 12, 1948, Serial No. 59,444

1 Claim. (Cl. 188—96)

This invention relates to a line guide stabilizer designed for use on oil field drilling rigs, the primary object of the invention being to provide a hydraulic line guide stabilizer, which will prevent the main cable from jumping from side to side when a sudden jerk of the main cable occurs, thereby eliminating any possibility of the cable overlapping as it winds around the drum of the assembly, which overlapping of the cable causes a severe strain on the main cable, resulting in excessive wear being directed to the cable.

Another object of the invention is to provide a line guide stabilizer which may be readily and easily attached to a line guide assembly, without the necessity of making extensive alterations in the usual line guide assembly.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is an elevational view of a line guide stabilizer constructed in accordance with the invention, a section of the body portion of the stabilizer being shown in section.

Fig. 2 is a sectional view taken on the line 2—2 of Fig. 1.

Fig. 3 is a fragmental sectional view illustrating a modified form of by-pass medium carried by the piston of the stabilizer.

Fig. 4 is a sectional view taken on the line 4—4 of Fig. 3.

Referring to the drawing in detail, the stabilizer comprises a body portion 5, which is in the form of a cylinder closed at its ends by the heads 6, the heads 6 being formed with openings through which the piston rod 7 operates, the rod 7 being formed with eyes 8 at its ends, to which the derrick cable ends are connected. Suitable packing indicated at 9, which may be in the form of the ordinary packing glands commonly used in packing a movable element used with air, gas or steam in a projecting barrel or cylinder, prevents leakage.

The reference character 10 indicates the piston of the stabilizer, which piston is secured to the piston rod 7 by means of the set screw 11, so that the piston moves longitudinally of the cylinder 5, with the piston rod 7.

The by-pass line used in by-passing fluid from one end of the cylinder 5 to the other end of the cylinder, comprises the pipe section 12 that extends into the cylinder 5 adjacent to one end thereof, the pipe 12 being connected with the pipe section 13 that extends into one end of the valve chamber 14 in which a valve operates to regulate and cut off the flow of fluid through the by-pass line, as desired, the valve being controlled by means of the valve stem 15 and handles 16 mounted on the upper end thereof.

The pipe 17 also connects with the valve chamber 14 and has connection with the pipe section 18, through the union 19, whereby the by-pass line may be disconnected should it be desired to repair or clean the device.

The pipe section 18 connects with the pipe 20 that extends into the cylinder 5 at the opposite end of the cylinder.

Blocks 21 are welded to the outer surface of the cylinder 5 and provide a support for the cylinder 5 to space it from the line guide assembly with which it is used.

Securing bolts indicated at 22 extend from the wall of the cylinder and afford means whereby the stabilizer may be secured to the line guide assembly with which it is used.

As shown by Fig. 3 of the drawing, I have eliminated the use of the by-pass line as shown by Fig. 1 of the drawing and have substituted a by-pass member 23 which is in the form of a threaded plug bored through its center, providing a passageway for fluid to pass from one side of the piston to the other. In order to regulate the amount of by-passed fluid it is only necessary to remove the plug and replace the plug with a plug having a larger or smaller bore to meet the requirements.

From the foregoing it will be seen that when the main cable which is attached to the eyes 8 at the ends of the rod 7, suddenly jerks, the severe strain directed to the cable will be taken up by the line guide stabilizer, eliminating any possibility of the main cable jumping from side to side, which usually results in the cable overlapping as it winds around its drum, the overlapping of the cable resulting in unnecessary wear.

It is obvious that after the sudden jar and strain directed to the device has been dissipated, the rod 7 will move within the cylinder 5 to equalize and stabilize the line guide.

Having thus described the invention, what is claimed is:

In a line guide stabilizer for drilling rigs, a cylinder containing fluid, a piston rod operating within the cylinder, a piston mounted on the rod intermediate the ends of the rod and operating within the cylinder, a set screw extending through the piston engaging the rod adjustably securing the piston to the rod, bolts extending from the cylinder by means of which the stabilizer is adapted to be secured to a line guide assembly, blocks secured to the cylinder and adapted to engage the line guide assembly holding the cylinder in spaced relation with the line guide assembly, eye members at the ends of the piston rod adapted to receive derrick cables, and means controlled by the action of the piston for by-passing fluid from one side of the piston to the other, as the piston moves longitudinally of the cylinder.

ARMAND C. GERVAIS.

REFERENCES CITED

The following references are of record in the file of this patent:

UNITED STATES PATENTS

| Number | Name | Date |
|---|---|---|
| 718,037 | Toennes | Jan. 6, 1903 |
| 1,074,482 | Washburn | Sept. 30, 1913 |
| 1,099,834 | Baldwin et al. | June 9, 1914 |
| 2,013,375 | Cyphers | Sept. 3, 1935 |